No. 746,641. PATENTED DEC. 8, 1903.
J. A. MEESE.
JOURNAL FOR WASHING MACHINES.
APPLICATION FILED JAN. 10, 1902.
NO MODEL.
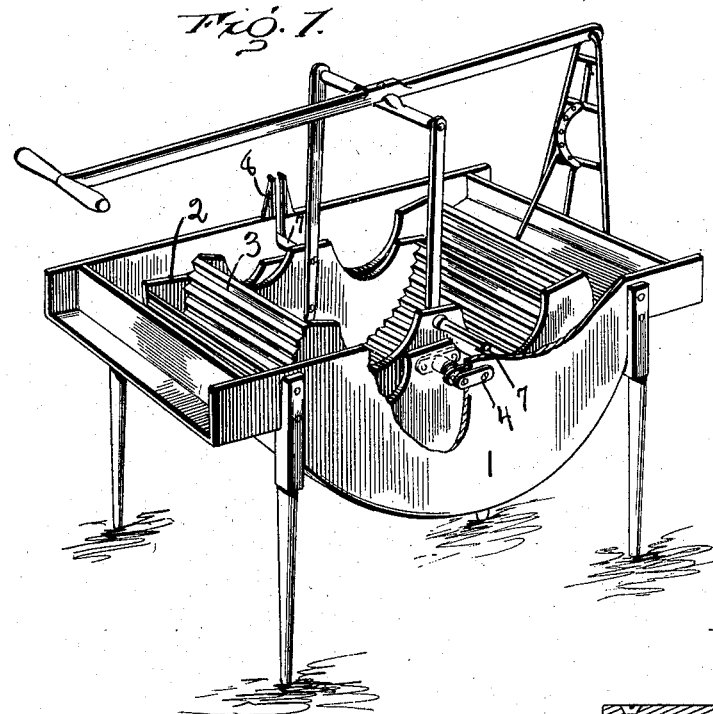
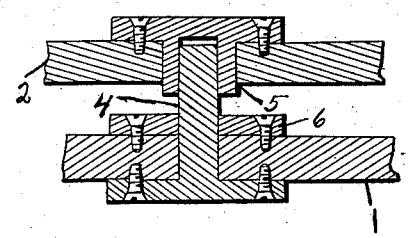
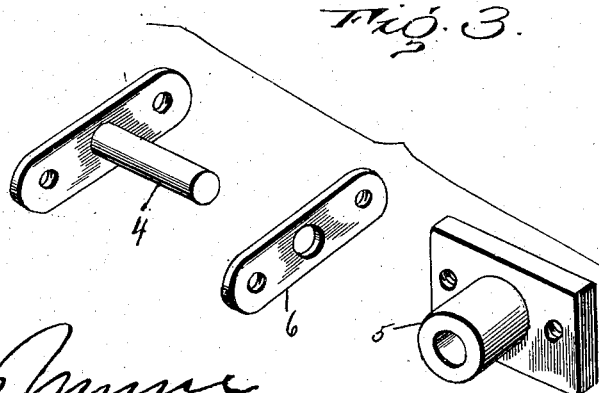

No. 746,641. Patented December 8, 1903.

UNITED STATES PATENT OFFICE.

JACOB A. MEESE, OF LOUISVILLE, OHIO.

JOURNAL FOR WASHING-MACHINES.

SPECIFICATION forming part of Letters Patent No. 746,641, dated December 8, 1903.

Application filed January 10, 1902. Serial No. 89,115. (No model.)

*To all whom it may concern:*

Be it known that I, JACOB A. MEESE, a citizen of the United States, residing at Louisville, in the county of Stark and State of Ohio, have invented certain new and useful Improvements in Journals for Washing-Machines; and I do hereby declare that the following is a full, clear, and exact description of the same, reference being had to the annexed drawings, making a part of this specification, and to the figures of reference marked thereon, in which—

Figure 1 is a perspective view showing my improved bearing properly connected to a washing-machine. Fig. 2 is a sectional view showing the different parts of the bearing properly assembled. Fig. 3 is a view showing the parts of the bearing detached.

The present invention has relation to journals for washing-machines; and it consists in the novel arrangement hereinafter described, and particularly pointed out in the claim.

Similar numerals of reference indicate corresponding parts in all the figures of the drawings.

In the accompanying drawings, 1 represents the washing-machine frame, which may be of the form shown.

The rubbers 2 and 3 may be of the form shown, and, as shown, the rubber 3 is located in the rubber 2. To the side members of the frame 1 are securely attached the fixed bearing 4, which fixed bearing extends through the sides and into the thimble-socket 5, which thimble-socket is securely attached to the side of the lower or outer rubber head, and for the purpose of assisting in supporting the lower or outer rubber head the inner plates 6 are provided, which plates are secured to the inner sides of the frame 1 and the bearing 4 extended through said inner plate.

I have described the above parts with reference to a single journal; but it will be understood that there are to be two, one upon each side, which are simply duplicates one of the other.

For the purpose of producing an easy movement the bearing 4 is formed of such a length that the outer rubber can be spaced from the inner side of the frame and the interposed plate 6 spaced from the end of the thimble-socket 5. For the purpose of providing a pivotal point for the inner rubber 3 the bearings 7 are provided, which bearings are located in the open slots 8. These parts, however, form no particular part of the present invention, and no detail description is necessary.

It is important that a rigid bearing is provided in order that the rubber may be maintained in proper relative position, and in order to accomplish this result the inner supporting-plates are provided and the bearings 4 extended through and beyond said plates.

Having fully described my invention, what I claim as new, and desire to secure by Letters Patent, is—

In a journal-bearing, a vibrating element, a socket-bearing in the same, a fixed element, a bearing in the same extended into the socket-bearing, a supporting-plate for the latter bearing, said supporting-plate located adjacent the socket-bearing, substantially as and for the purpose specified.

In testimony that I claim the above I have hereunto subscribed my name in the presence of two witnesses.

JACOB A. MEESE.

Witnesses:
J. A. JEFFERS,
F. W. BOND.